United States Patent
Li et al.

(10) Patent No.: US 11,333,938 B2
(45) Date of Patent: May 17, 2022

(54) DISPLAY PANEL, DRIVING METHOD THEREOF, AND DISPLAY DEVICE

(71) Applicant: BOE Technology Group Co., Ltd., Beijing (CN)

(72) Inventors: Zhongxiao Li, Beijing (CN); Xue Dong, Beijing (CN); Xiaochuan Chen, Beijing (CN); Wenqing Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 20 days.

(21) Appl. No.: 16/649,387

(22) PCT Filed: Sep. 11, 2019

(86) PCT No.: PCT/CN2019/105298
§ 371 (c)(1),
(2) Date: Mar. 20, 2020

(87) PCT Pub. No.: WO2020/063343
PCT Pub. Date: Apr. 2, 2020

(65) Prior Publication Data
US 2021/0223611 A1    Jul. 22, 2021

(30) Foreign Application Priority Data
Sep. 27, 2018   (CN) .......................... 201811133943.6

(51) Int. Cl.
*G02F 1/1333*   (2006.01)
*G02F 1/1343*   (2006.01)
(Continued)

(52) U.S. Cl.
CPC .. *G02F 1/134381* (2021.01); *G02F 1/133512* (2013.01); *G02F 1/133514* (2013.01);
(Continued)

(58) Field of Classification Search
CPC ......... G02F 1/133512; G02F 1/134381; G02F 1/134372; G02F 1/134363; G02F 1/29; G02F 1/291
See application file for complete search history.

(56) References Cited

U.S. PATENT DOCUMENTS 5,926,244 A * 7/1999 Takeda ............... G02F 1/134309
349/139
8,982,308 B2 * 3/2015 Jen ....................... H04N 13/307
349/141
(Continued)

FOREIGN PATENT DOCUMENTS

CN    105867011 A    8/2016
CN    106526942 A *  3/2017 ........... G02F 1/1337
(Continued)

OTHER PUBLICATIONS

First office action of Chinese application No. 201811133943.6 dated Sep. 17, 2020.
(Continued)

*Primary Examiner* — Paisley L Wilson
(74) *Attorney, Agent, or Firm* — Fay Sharpe LLP

(57) ABSTRACT

A display panel, a driving method thereof, and a display device are provided. The display panel includes: a filter layer including a light shielding region and a light transmitting region in each sub-pixel region, the light transmitting region in each of the sub-pixel regions surrounding the light shielding region; a light extracting layer including a light extracting element in each of the sub-pixel regions, the light extracting element being configured to provide light rays propagating toward the light shielding region of the sub-pixel region where the light extracting element is; and a light transmitting layer configured to provide sub-pixel regions at a bright state gratings distributed in a first plane and a second
(Continued)

plane, so that the light rays provided by the light extracting element are diverged in the first plane and the second plane.

20 Claims, 8 Drawing Sheets

(51) Int. Cl.
G02F 1/1335 (2006.01)
G02F 1/29 (2006.01)
G09G 3/36 (2006.01)
F21V 8/00 (2006.01)

(52) U.S. Cl.
CPC ......... *G02F 1/134363* (2013.01); *G02F 1/29* (2013.01); *G09G 3/3688* (2013.01); *G02B 6/0036* (2013.01); *G09G 2300/0426* (2013.01)

(56) References Cited

U.S. PATENT DOCUMENTS

| 2018/0031752 A1* | 2/2018 | Ferrini ................ G02B 6/0016 |
| 2019/0033656 A1 | 1/2019 | Tan et al. |
| 2019/0101681 A1 | 4/2019 | Meng et al. |
| 2019/0129239 A1 | 5/2019 | Li et al. |
| 2019/0204691 A1 | 7/2019 | Tan et al. |
| 2019/0278152 A1 | 9/2019 | Wang |
| 2020/0142247 A1 | 5/2020 | Zhao et al. |

FOREIGN PATENT DOCUMENTS

| CN | 106526942 A | 3/2017 |
| CN | 107219685 A | 9/2017 |
| CN | 107632451 A | 1/2018 |
| CN | 108051961 A | 5/2018 |
| CN | 108333835 A | 7/2018 |
| CN | 108398828 A | 8/2018 |
| CN | 108415190 A | 8/2018 |
| CN | 108490702 A | 9/2018 |
| JP | H0843861 A | 2/1996 |
| KR | 20110071639 A | 6/2011 |

OTHER PUBLICATIONS

International search report of PCT application No. PCT/CN2019/105298 dated Nov. 27, 2019.

Second office action of Chinese application No. 201811133943.6 dated Apr. 25, 2021.

* cited by examiner

DISPLAY PANEL, DRIVING METHOD THEREOF, AND DISPLAY DEVICE

The present disclosure is a 371 of PCT Patent Application No. PCT/CN2019/105298, filed Sep. 11, 2019, which claims priority to Chinese Patent Application No. 201811133943.6, filed Sep. 27, 2018 and entitled "DISPLAY PANEL, DRIVING METHOD THEREOF AND DISPLAY DEVICE" the entire contents of which are incorporated herein by reference.

TECHNICAL FIELD

The present disclosure relates to the field of display, and in particular to a display panel, a driving method thereof, and a display device.

BACKGROUND

The liquid crystal display is a display device applied in large scale at present, and has a series of advantages such as high color gamut, thinness and lightness, and short response time.

SUMMARY

The present disclosure provides a display panel, a driving method thereof, and a display device.

At least one embodiment of the present disclosure provides a display panel. The display panel includes:

a filter layer, comprising a light shielding region and a light transmitting region in each sub-pixel region, the light transmitting region in each of the sub-pixel regions surrounding the light shielding region;

a light extracting layer, comprising a light extracting element in each of the sub-pixel regions, the light extracting element being configured to provide light rays propagating toward the light shielding region of the sub-pixel region where the light extracting element is; and a light transmitting layer located between the filter layer and the light extracting layer and configured to provide sub-pixel regions at a bright state gratings distributed in a first plane and a second plane so that the light rays provided by the light extracting element are diverged in the first plane and the second plane, the first plane and the second plane being intersected with each other and perpendicular to a light emitting surface of the display panel.

In a possible implementation, the light transmitting layer includes:

a liquid crystal layer, and a first electrode group and a second electrode group located on two sides of the liquid crystal layer, respectively;

the first electrode group is located on a side of the liquid crystal layer close to the filter layer; and the second electrode group is located on a side of the liquid crystal layer close to the light extracting layer;

wherein the first electrode group is configured to form a liquid crystal grating located in the first plane in the liquid crystal layer by an electric field generated by the first electrode group, so that the light rays provided by the light extracting element are diverged in the first plane; and the second electrode group is configured to form a liquid crystal grating located in the second plane in the liquid crystal layer by an electric field generated by the second electrode group, so that the light rays provided by the light extracting element are diverged in the second plane.

In a possible implementation, the first electrode group includes a first pixel electrode layer and a first common electrode layer, and the second electrode group includes a second pixel electrode layer and a second common electrode layer; wherein the first common electrode layer is located between the filter layer and the first pixel electrode layer;

the second common electrode layer is located between the second pixel electrode layer and the light extracting layer; and the first pixel electrode layer includes a plurality of first strip electrodes arranged along a first direction; the second pixel electrode layer includes a plurality of second strip electrodes arranged along a second direction; and each of the sub-pixel regions is provided with a plurality of the first strip electrodes and a plurality of the second strip electrodes, the first direction being parallel to the first plane, and the second direction being parallel to the second plane.

In a possible implementation, the first pixel electrode layer further includes a block electrode located in each of the sub-pixel regions, respectively;

an orthographic projection of the block electrode on a plane where the display panel is located is located at least partially overlaps with an orthographic projection of the light shielding region of the filter layer on the plane where the display panel is located; and the display panel further includes a plurality of signal lines, the first strip electrodes and the block electrode in each of the sub-pixel regions being connected to different signal lines, respectively.

In a possible implementation, the block electrode is configured to deflect, in sub-pixel regions at a dark state, a long axis of a liquid crystal in the liquid crystal layer toward the light shielding region by an electric field generated by the block electrode.

In a possible implementation, the display panel further includes.

a first planarizing layer, located between the filter layer and the first common electrode layer;

a first insulating layer, located between the first pixel electrode layer and the first common electrode layer;

a second insulating layer, located between the second pixel electrode layer and the second common electrode layer; and a second planarizing layer, located between the second common electrode layer and the light extracting layer.

In a possible implementation manner, the display panel further includes:

a base substrate, located on a side of the filter layer away from the liquid crystal layer.

In a possible implementation, the first common electrode layer, the first pixel electrode layer, the second pixel electrode layer, and the second common electrode layer are all formed by transparent conductive materials.

In a possible implementation, the light extracting element is configured to converge transmitted light toward the light shielding region of the sub pixel region where the light extracting element is located.

In a possible implementation, the first direction and the second direction are perpendicular to each other.

In a possible implementation, each of the light transmitting region includes a color filter region, and the color filter region in each of the sub-pixel regions surrounds the light shielding region; and a projection area of the light extracting element is not less than a sum of a projection area of the light shielding region and a projection area of the color filter region on the plane where the display panel is located.

In a possible implementation, the light shielding region is circular, the color filter region is annular and concentric with the light shielding region.

In a possible implementation, the light extracting layer includes a light guiding plate, and each of the light extracting elements is a grating on the light emitting surface of the light guiding plate.

In a possible implementation, the display panel further includes an edge-lit light source located at an edge of the light guiding plate.

At least one embodiment of the present disclosure provides a display device, and the display device includes any one of the display panels described above.

In a possible implementation, the display panel further includes:

a driving circuit, configured to: provide a first data voltage to a plurality of the first strip electrodes in sub-pixel regions at the bright state to form a liquid crystal grating located in the first plane in the liquid crystal layer, so that the light rays provided by the light extracting elements are diverged in the first plane, and provide a second data voltage to a plurality of the second strip electrodes in sub-pixel regions at the bright state to form a liquid crystal grating located in the second plane in the liquid crystal layer, so that the light rays provided by the light extracting elements are diverged in the second plane.

In a possible implementation, the driving circuit is further configured to provide a common voltage to a plurality of the first strip electrodes and a plurality of the second strip electrodes in sub-pixel regions at a dark state, so that the light rays provided by the light extracting element penetrate the liquid crystal layer and reach the light shielding regions.

In a possible implementation, the first pixel electrode layer further includes a block electrode located in each of the sub-pixel regions, respectively, and an orthographic projection of the block electrode on a plane where the display panel is located at least partially overlaps with an orthographic projection of the light shielding region of the filter layer on the plane where the display panel is located; and the driving circuit is further configured to provide a third data voltage to block electrodes in sub-pixel regions at a dark state, so that liquid crystal molecules in the liquid crystal layer of the sub-pixel region are deflected toward an orientation in which a long axis is parallel to a propagating direction of light rays provided by the light extracting element.

At least one embodiment of the present disclosure provides a driving method of a display panel, and the display panel is any one of the display panels mentioned above. The method includes:

providing a first data voltage to a plurality of the first strip electrodes in sub-pixel regions at the bright state to form a liquid crystal grating located in a first plane in the liquid crystal layer, so that the light rays provided by the light extracting elements are diverged in the first plane, and providing a second data voltage to a plurality of the second strip electrodes in sub-pixel regions at the bright state to form a liquid crystal grating located in a second plane in the liquid crystal layer, so that the light rays provided by the light extracting elements are diverged in the second plane.

In a possible implementation, the method further includes:

providing a common voltage to a plurality of the first strip electrodes and a plurality of the second strip electrodes in sub-pixel regions at a dark state, so that the light rays provided by the light extracting element penetrate the liquid crystal layer and reach the light shielding regions.

In a possible implementation, the first pixel electrode layer further includes a block electrode located in each of the sub-pixel regions, respectively, and an orthographic projection of the block electrode on a plane where the display panel is located at least partially overlaps with an orthographic projection of the light shielding region of the filter layer on the plane where the display panel is located; and the method further includes:

providing a third data voltage to block electrodes in sub-pixel regions at a dark state, so that liquid crystal molecules in the liquid crystal layer of the sub-pixel region are deflected toward an orientation in which a long axis is parallel to a propagating direction of the light rays provided by the light extracting element.

DETAILED DESCRIPTION

In order to describe the principles and advantages in the embodiments of the present more clearly, the present disclosure will be described in detail below in combination with the accompanying drawings. Apparently, the described embodiments are merely some embodiments, rather than all embodiments, of the present disclosure. Based on the embodiments of the present disclosure, all other embodiments derived by a person of ordinary skill in the art without creative efforts shall fall within the protection scope of the present disclosure. Unless otherwise defined, technical terms or scientific terms used in the present disclosure shall be of ordinary meaning as understood by those of ordinary skill in the art to which the present disclosure pertains. The terms "first" or "second" or a similar term used in the present disclosure does not denote any order, quantity, or importance, but is merely used to distinguish different components. The term "comprising" or a similar term means that elements or items which appear before the term include the elements or items listed after the term and their equivalents, and do not exclude other elements or items.

A traditional liquid crystal displays mainly utilize the liquid crystal polarization modulation to achieve display. The display panel of each of the liquid crystal displays requires two polarizing plates (an upper polarizing plate and a lower polarizing plate), and only a part of the light rays, the polarization state of which is changed by the liquid crystal, can be emitted. Thus, the overall optical efficiency is very low, which is presented as low display brightness and high display power consumption.

Figure 1:
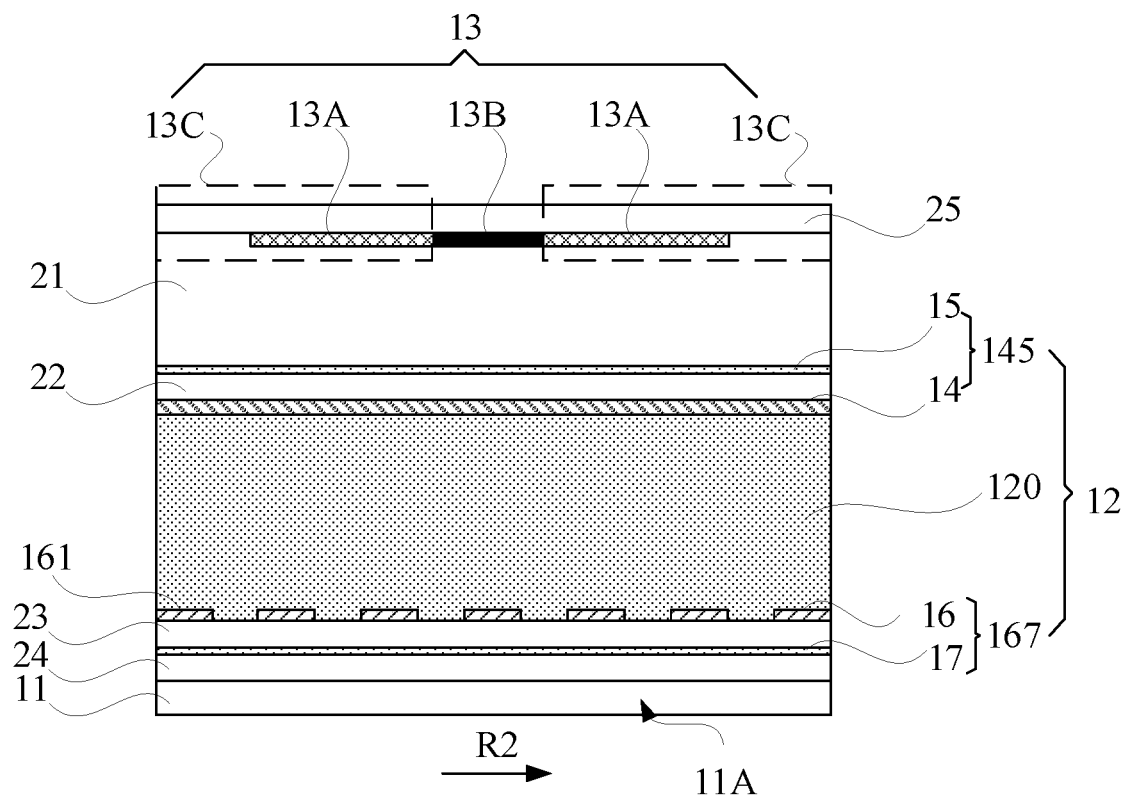
FIG. 1 and FIG. 2 are schematic diagrams of sectional structures of a display panel in two different direction according to an embodiment of the present disclosure, respectively.
Figure 2:
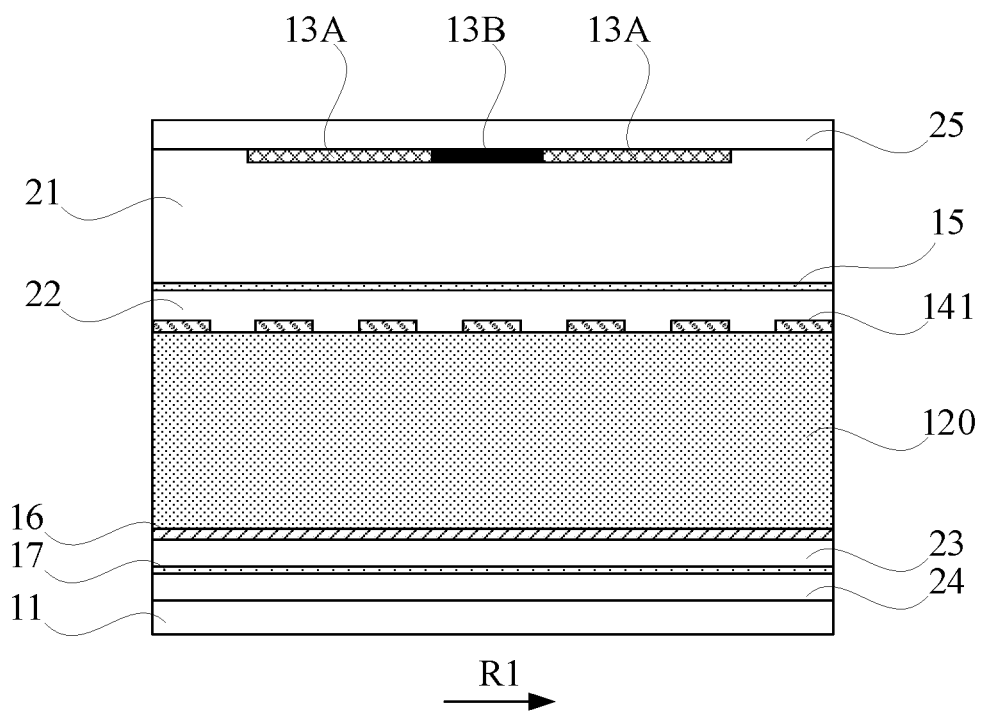

FIG. 1 and FIG. 2 are schematic diagrams of sectional structures of a display panel in two different directions according to an embodiment of the present disclosure, respectively. Referring to FIGS. 1 and 2, the display panel includes a light extracting layer 11, a light transmitting layer 12, and a filter layer 13. In terms of the positional relationship, the light transmitting layer 12 is located between the filter layer and the light extracting layer 11.

The filter layer 13 includes a light shielding region 13B and a light transmitting region 13C in each sub-pixel region. The light transmitting region 13C region surrounds the light shielding region 13B in each sub-pixel.

A light extracting layer 11 includes a light extracting element 11A in each sub-pixel region. The light extracting element 11A is configured to provide light rays propagating toward the light shielding region 13B of the sub-pixel region where the light extracting element 11A is located.

The light transmitting layer 12 is configured to provide the sub-pixel regions at a bright state with gratings distributed in a first plane and a second plane, so that the light rays provided by the light extracting element 11 are diverged in the first plane and the second plane. The first plane and the second plane are intersected with each other and both perpendicular to a light emitting surface of the display panel.

As can be seen from the aforesaid technical solution, on basis of the internal structure of the display panel, the light rays converged by the light extracting element may directly penetrate the liquid crystal layer and reach the light shielding region, thereby achieving the dark display of the sub-pixel region. Moreover, the light rays converged by the light extracting element may also be diverged by the light transmitting layer and reach the light transmitting region surrounded by the light shielding region, thereby achieving the bright display of the sub-pixel region. Based on this, the present disclosure may help to achieve a liquid crystal display device that requires no polarizing plate and may diverge and emit the light in different polarization directions, so that, compared with the case that only a part of the light in the polarization state can be emitted, a liquid crystal display with higher optical efficiency and better transparency may be achieved.

As shown in FIG. 1, the region out of the light shielding region 13B is the light transmitting region 13C, and the color filter region 13A is a region capable of filtering colors in the light transmitting region 13C.

In a possible implementation of the present disclosure, the light transmitting layer 12 may include:

a liquid crystal layer 120, and a first electrode group 145 and a second electrode group 167 located on two sides of the liquid crystal layer 120, respectively.

The first electrode group 145 is located on a side of the liquid crystal layer 120 close to the filter layer 13.

The second electrode group 167 is located on a side of the liquid crystal layer 120 close to the light extracting layer 11.

The first electrode group 145 is configured to form a liquid crystal grating located in the first plane in the liquid crystal layer 120 by an electric field generated by the first electrode group, so that the light rays provided by the light extracting element 11 are diverged in the first plane; and the second electrode group 167 is configured to form a liquid crystal grating located in the second plane in the liquid crystal layer 120 by an electric field generated by the second electrode group, so that the light rays provided by the light extracting element 11 are diverged in the second plane.

In this implementation, the liquid crystal is adopted to achieve the light transmitting layer and generate a liquid crystal grating using the electric field generated by the electrode groups. The liquid crystal grating can diverge the light rays provided by the light extracting element 11, and the light may be displayed by the light transmitting region 13C, thereby achieving the bright state. When the liquid crystal grating is not formed in the liquid crystal, the liquid crystal merely has a transmitting function, and the light is provided to the light shielding region 13B, thereby achieving the dark state.

Exemplarily, the first electrode group 145 may include a first pixel electrode layer 14 and a first common electrode layer 15, and the second electrode group 167 may include a second pixel electrode layer 16 and a second common electrode layer 17.

In an implementation of the embodiment of the present disclosure, the display panel further includes a first planarizing layer 21, a first insulating layer 22, a second insulating layer 23, a second planarizing layer 24, and a base substrate 25.

In terms of the positional relationship, the first pixel electrode layer 14 is located between the filter layer and the liquid crystal layer 120; the first common electrode layer 15 is located between the filter layer and the first pixel electrode layer 14; the second pixel electrode layer 16 is located between the liquid crystal layer 120 and the light extracting layer 11; the second common electrode layer 17 is located between the second pixel electrode layer 16 and the light extracting layer 11; the first planarizing layer 21 is located between the filter layer and the first common electrode layer 15; the first insulating layer 22 is located between the first pixel electrode layer 14 and the first common electrode layer 15; the second insulating layer 23 is located between the second pixel electrode layer 16 and the second common electrode layer 17; the second planarizing layer 24 is located between the second common electrode layer 17 and the light extracting layer 11; and the base substrate 25 is located on a side of the filter layer away from the liquid crystal layer 120. It should be noted that the display panel includes a plurality of sub-pixel regions. FIG. 1 and FIG. 2 show the sectional structure of the display panel in a single sub-pixel region, and the display panel may have the same or corresponding structure in each of the sub-pixel regions. For instance, the display panel may have the same structure in sub-pixel regions of the same color, and the corresponding structure in sub-pixel regions of difference colors. In an example, the display panel includes three types of sub-pixel regions: a red sub-pixel region, a blue sub-pixel region, and a green sub-pixel region. The color filter region 13A in the red sub-pixel region is of a red filter material; the color filter region 13A in the blue sub-pixel region is of a blue filter material; and the color filter region 13A in the green sub-pixel region is of a green filter material; and except that, all of the three types of sub-pixel regions have the same internal structure.

The image display of the display panel requires each sub-pixel region to exhibit a specified brightness level in accordance with the control, which is mainly achieved in the embodiment by matching the filter layer, the light extracting layer 11, and the liquid crystal layer 120 with the electrical signals on electrode layers.

In the filter layer, the color filter region 13A in each of the sub-pixel regions surrounds the light shielding region 13B of the sub-pixel region. The light extracting layer 11 includes a light extracting element in each of the sub-pixel regions. The light extracting element is configured to provide light rays propagating toward the light shielding region 13B of the sub-pixel region where the light extracting element is located. It should be noted that the source of light rays of the light extracting element may include at least one of the light rays propagating in light guiding plate by total reflection, ambient light, and backlight source; in addition, the light rays provided by the light extracting element can propagate toward the light shielding region 13B in the form of parallel light and/or converged light.

Figure 3:
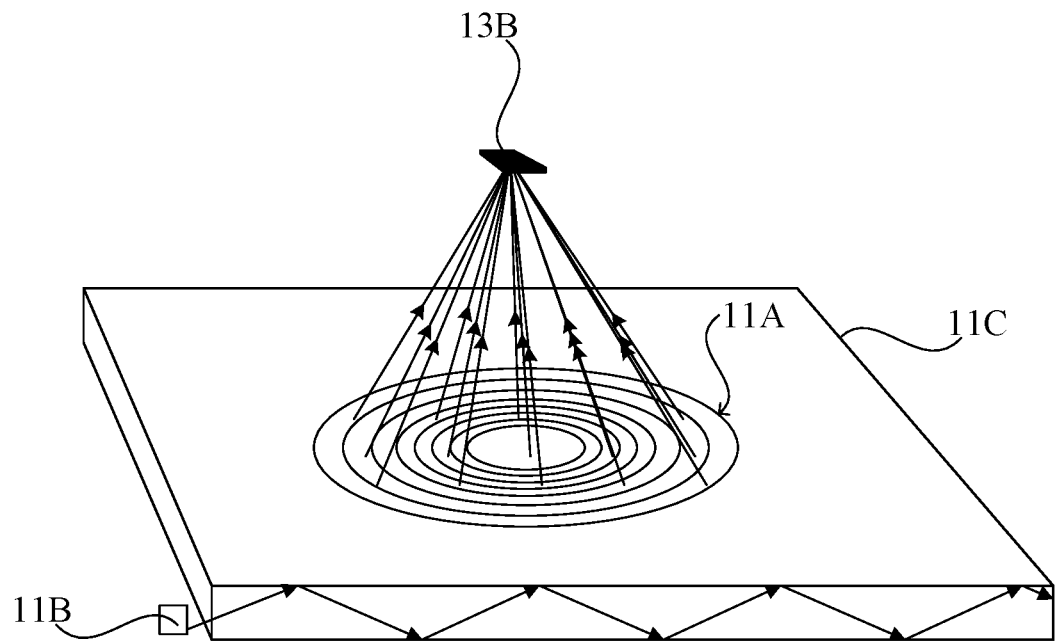
FIG. 3 is a schematic diagram of an internal light path of a display panel when a sub-pixel region is at a dark state according to an embodiment of the present disclosure.

As an example, FIG. 3 is a schematic diagram of an internal light path of a display panel when a sub-pixel region is at a dark state according to an embodiment of the present disclosure. Referring to FIG. 3, the light extracting layer 11 in this example includes a light extracting element 11A, an edge-lit light source 11B, and a light guiding plate 11C. The edge-lit light source 11B is located at the edge of the light guiding plate 11C; and the light extracting element 11A is a concentric annular grating on the light emitting surface (upper surface) of the light guiding plate 11C. Referring to FIG. 1, FIG. 2, and FIG. 3, when a common voltage (corresponding to a reference voltage with a zero gray scale, generally 0V) is applied to each of the electrode layers, the liquid crystal layer 120 behaves as a layer of uniform transparent medium due to the state of the liquid crystal molecules (when the liquid crystal layer 120 is of a vertically oriented liquid crystal material, the liquid crystal molecules in the liquid crystal layer 120 are all perpendicular to the display panel and cannot diverge the light rays that are vertically transmitted). Therefore, the light rays, which are provided by the edge-lit light source 11B in the light guiding plate 11C and propagate laterally by total reflection, can be coupled out at each of the light extracting elements 11A and can form transmitted light converged toward the light shielding region 13B of the sub-pixel region where the light extracting element 11A is located as shown in FIG. 3 based on the grating structure of the light extracting element I 1A. Since the transmitted light of the light extracting element 11A in the sub-pixel region is converged into the light shielding region 13B and lacks the light rays that penetrate the color filter region 13B and are emitted as display lights, the sub-pixel region is at the dark state (such as, a display state with a gray scale value less than 10 or a gray scale value of 0).

It should be noted that, in addition to the light extraction from the outside by the edge-lit light source 11B in conjunction with the light guiding plate 11C in the aforesaid example, the light extraction may also be achieved by, for example, a direct-lit light source or ambient light, and may be a combination of at least two of the above manners. Furthermore, the light extracting layer 11 can cooperate with any kind of backlight source to achieve light extraction to a possible extent. In this case, the edge-lit light source 11B may be a component independent of the light extracting layer 11. Regarding the implementation of the light extracting element 11A, various parameters of the concentric ring grating can be determined by, for example, optimizing the design, and can be replaced to a possible extent by other optical elements (such as convex lenses, cylindrical lenses, or other types of gratings) that can achieve the convergence function.

It should be further noted that the transmitted light of the light extracting element, as can be seen from FIG. 1 and FIG. 2, needs to sequentially penetrate the second planarizing layer 24, the second common electrode layer 17, the second insulating layer 23, the second pixel electrode layer 16, the liquid crystal layer 120, the first pixel electrode layer 14, the first insulating layer 22, the first common electrode layer 15, and the first planarizing layer 21 before reaching the light shielding region 13B. The transmitted light may undergo refraction, reflection, scattering, absorption, or the like at the interfaces of the mediums, so the actual transmitted light may not be converged into the light shielding region 13B all along a straight line as shown in FIG. 3. Therefore, respective layer structures shall be firstly formed by transparent materials (e.g., conductive transparent materials such as indium tin oxide, silver nanowires, graphene films, metal grids, etc., and insulating transparent materials such as silicon oxides, silicon nitrides, insulating transparent organic polymers, etc.) to ensure the intensity of the transmitted light; and secondly, the refractive index and thickness of respective layer structures should match the optical parameters of the light extracting element, so that the transmitted light of the light extracting element can be converged into the light shielding region 13B when the sub-pixel region is at the dark state.

Figure 4:
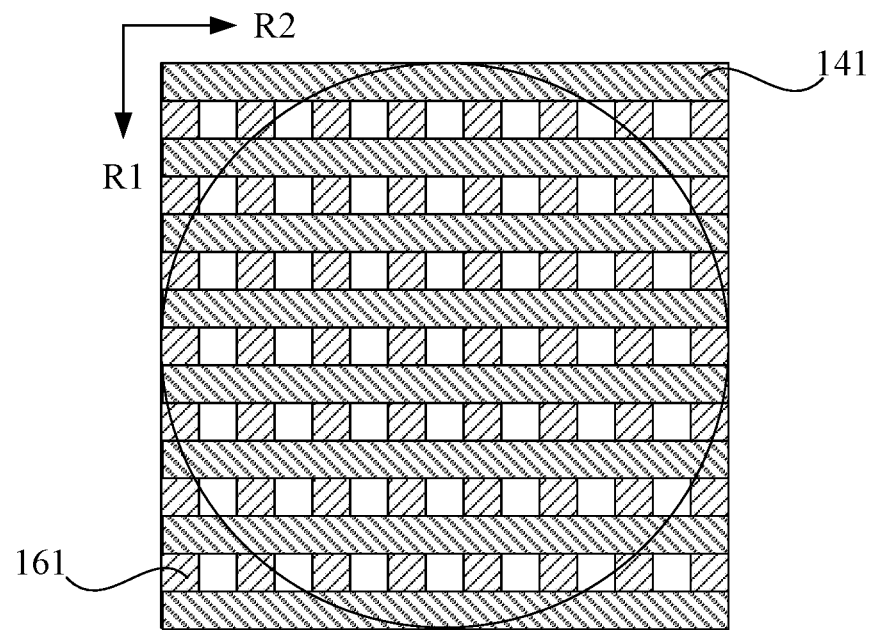
FIG. 4 is a schematic diagram of structures of a first pixel electrode layer and a second pixel electrode layer in a display panel according to an embodiment of the present disclosure.

FIG. 4 is a schematic diagram of structures of a first pixel electrode layer and a second pixel electrode layer in a display panel according to an embodiment of the present disclosure. Referring to FIGS. 1, 2, and 4, the first pixel electrode layer 14 includes a plurality of first strip electrodes 141 arranged along a first direction R1, and the second pixel electrode layer 16 includes a plurality of second strip electrodes 161 arranged along a second direction R2, the first direction being parallel to the first plane, and the second direction being parallel to the second plane. In FIG. 4, a circle is adopted to represent the outer boundary of the light extracting element in a sub-pixel region (or the outer boundary of the color filter region 13B), and it can be seen that each of the sub-pixel region is provided with a plurality of first strip electrodes 141 and a plurality of second strip electrodes 161. The case where the first direction R1 and the second direction R2 are perpendicular to each other is taken as an example in FIG. 4. It should be noted that the first direction R1 and the second direction R2 may be intersected with each other at other angles. It should be noted that the strip refers to a shape having a certain width and extending in the length direction, and generally the length of the shape is much greater than the width, such as the first stripe electrode 141 and the second stripe electrode 161 shown in FIG. 4.

Figure 5:
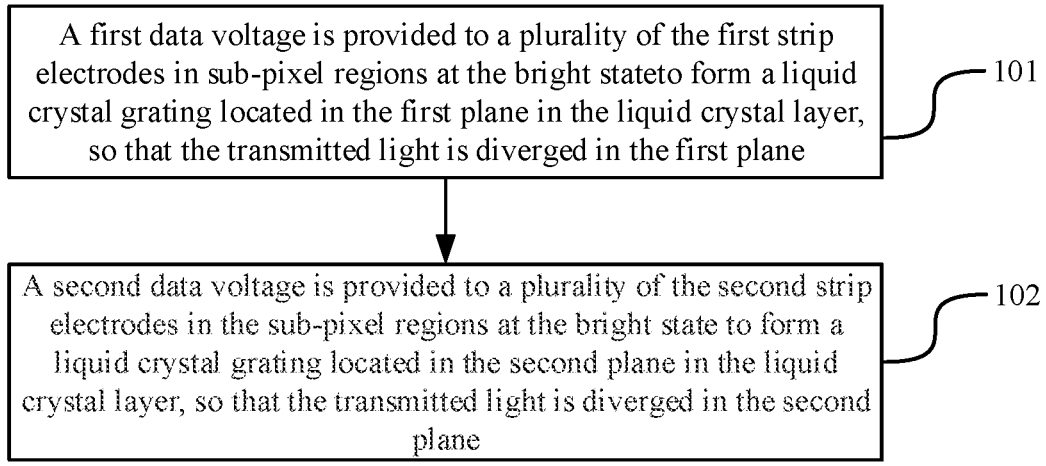
FIG. 5 is a flow chart of a driving method of a display panel according to an embodiment of the present disclosure.

Based on the aforesaid structure, FIG. 5 is a flow chart of a driving method of a display panel according to an embodiment of the present disclosure. Referring to FIG. 5, the method includes following steps.

In step 101, a first data voltage is provided to a plurality of the first strip electrodes in sub-pixel regions at the bright state (such as, a display state with a grayscale value greater than or equal to 10 or a grayscale value greater than 0) to form a liquid crystal grating located in the first plane in the liquid crystal layer, so that the transmitted light is diverged in the first plane.

In step 102, a second data voltage is provided to a plurality of the second strip electrodes in the sub-pixel regions at the bright state to form a liquid crystal grating located in the second plane in the liquid crystal layer, so that the transmitted light is diverged in the second plane.

It should be noted that the method, corresponding the aforesaid description, may further include: providing a common voltage to a plurality of the first strip electrodes and a plurality of the second strip electrodes in the sub-pixel regions at the dark state, so that the light rays provided by the light extracting element penetrate the liquid crystal layer and reach the light shielding regions. In an example, the display process of the display panel includes a process of respectively controlling each sub-pixel region to exhibit the brightness level specified by the data signal in each display frame. Therefore, for each sub-pixel region in the bright state, the aforesaid steps 101 and 102 can be performed simultaneously.

Figure 6:
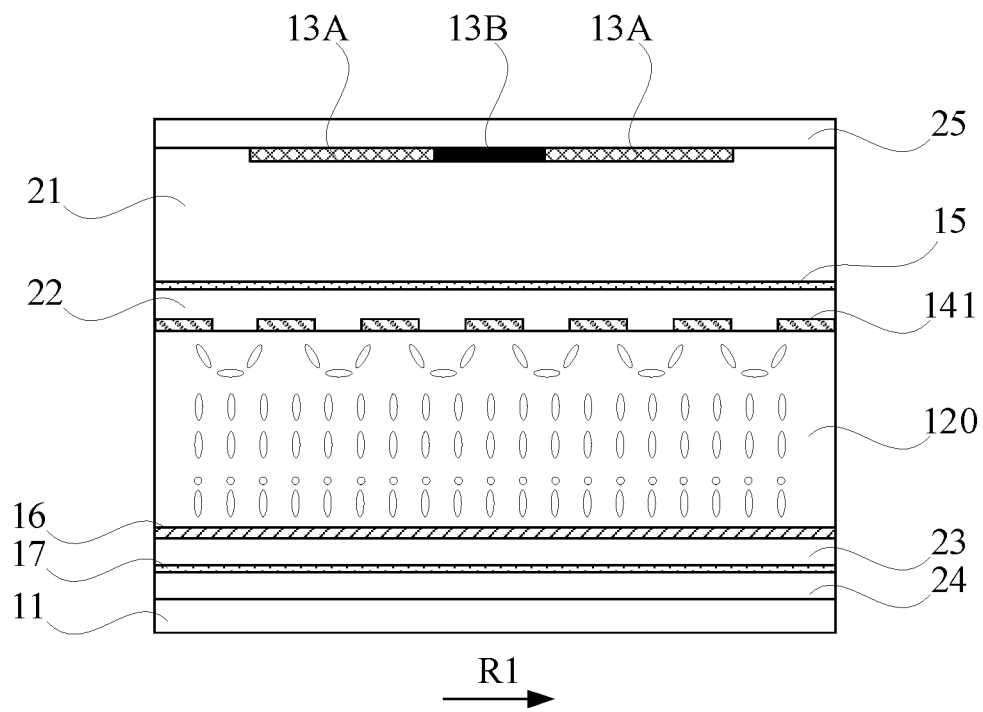
FIG. 6 and FIG. 7 are schematic diagrams of an internal state of a display panel in two different directions according to an embodiment of the present disclosure, respectively.
Figure 7:
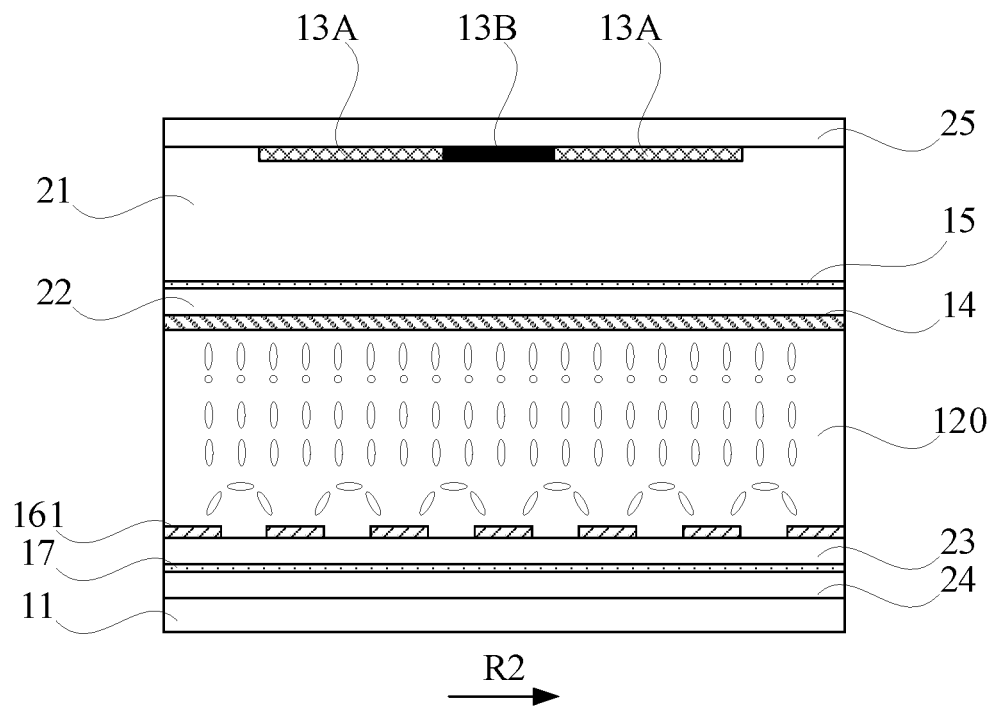

As an example, FIG. 6 and FIG. 7 are schematic diagrams of an internal state of a display panel in two different directions according to an embodiment of the present disclosure, respectively. It should be noted that FIGS. 6 and 7 show the arrangement of the liquid crystal molecules of the liquid crystal layer 120 in the sub-pixel region at the bright state. Referring to FIGS. 6 and 7, at this point, a first data voltage is applied to the plurality of first strip electrodes 141 in the sub-pixel region; a second data voltage is applied to the plurality of second strip electrodes 161, and a common voltage is applied to the first common electrode layer 15 and the second common electrode layer 17. Thus, referring to FIG. 6, a horizontal electric field is formed between the first pixel electrode layer 14 and the first common electrode layer 15, so that liquid crystal molecules in a portion of the liquid crystal layer 120 close to the first pixel electrode layer 14 are distributed according to the horizontal electric field, thereby forming the liquid crystal grating located in the first plane (in FIG. 6, the liquid crystal molecules are represented by rod-like ellipsoids, and three liquid crystal molecules arranged in an arch shape represent a grating cycle of the liquid crystal grating). Referring to FIG. 7, another horizontal electric field is formed between the second pixel electrode layer 16 and the second common electrode layer 17, so that liquid crystal molecules in a portion of the liquid crystal layer 120 close to the second pixel electrode layer 16 are distributed according to the horizontal electric field, thereby forming the liquid crystal grating located in the second plane (in FIG. 7, the liquid crystal molecules are represented by rod-like ellipsoids, and three liquid crystal molecules arranged in an arch shape represent a grating cycle of the liquid crystal grating). The remaining liquid crystal molecules are all located in the middle of the liquid crystal layer 120, where the orientation of the liquid crystal molecules does not change due to the weak electric field strength. It should be noted that since FIG. 6 and FIG. 7 show the internal states of the same display panel in two different directions, respectively, a grating cycle represented by three long rod-like ellipsoids in FIG. 6 is shown in FIG. 7 as a combination of a short rod-like ellipsoid and a small circle, and a grating cycle represented by three long rod-like ellipsoids in FIG. 7 is shown in FIG. 6 as a combination of a short rod-like ellipsoid and a small circle, which indicates the difference in the projection shape of each liquid crystal molecule in different directions, the liquid crystal molecule being represented by rod-like ellipsoids.

Figure 8:
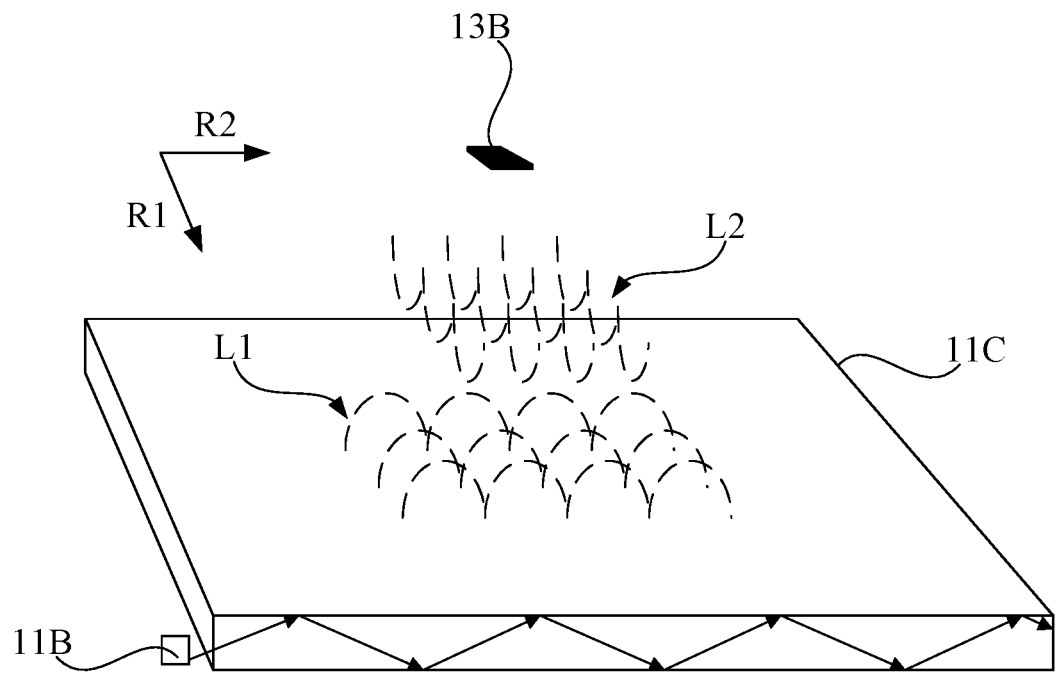
FIG. 8 is a schematic diagram of a bright display principle of a display panel according to an embodiment of the present disclosure.

FIG. 8 is a schematic diagram of a bright display principle of a display panel according to an embodiment of the present disclosure. Referring to FIG. 8, the liquid crystal layer 120 is formed with the liquid crystal grating L2 located in the first plane and the liquid crystal grating L1 located in the second plane, respectively, and the liquid crystal molecules arranged in the arch shape can diverge the transmitted light in the first plane and the second plane, respectively, so that the transmitted light originally converged in the light shielding region 13B as shown in FIG. 3 is diverged upon penetrating the liquid crystal layer 120, and then reaches and penetrates the color filter region 13A around the light shielding region 13B to form the display lights, thereby enabling the sub-pixel region to exhibit the bright state.

Figure 9:
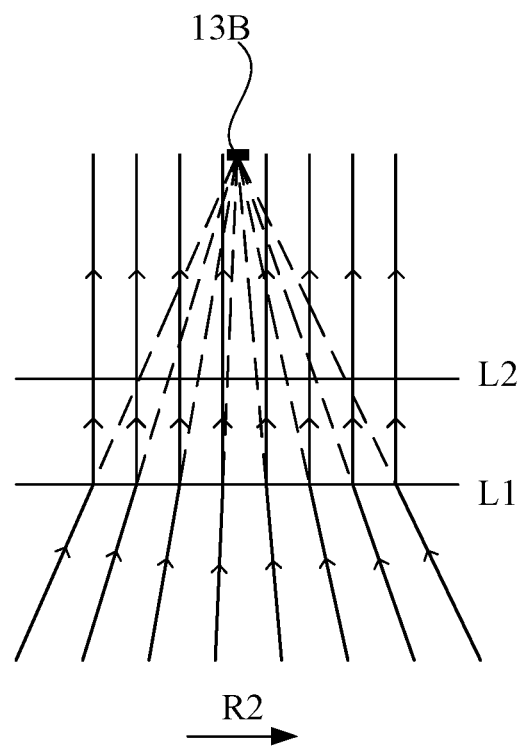
FIG. 9 and FIG. 10 are schematic diagrams of internal light paths of a display panel in two different directions when a sub-pixel region is at a bright state according to an embodiment of the present disclosure.
Figure 10:
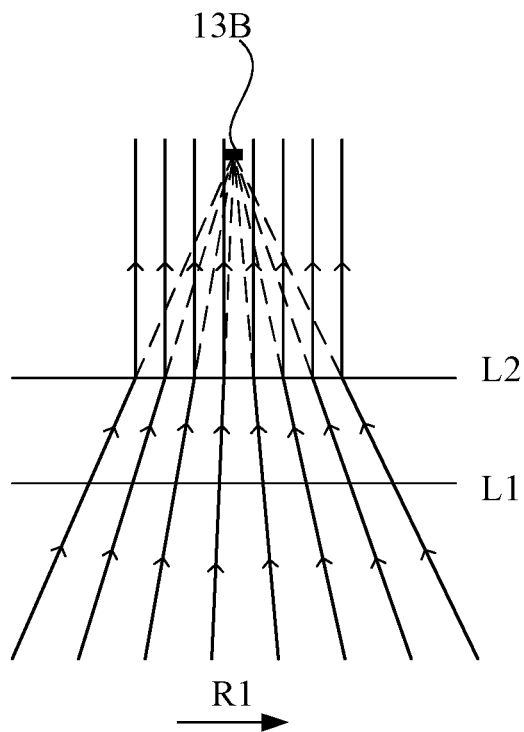

FIG. 9 and FIG. 10 are schematic diagrams of internal light paths of a display panel in two different directions when a sub-pixel region is at a bright state according to an embodiment of the present disclosure. Referring to FIGS. 9 and 10, the liquid crystal grating L1 located in the second plane can diverge the transmitted light in the second plane, but cannot diverge the transmitted light in the first plane. Thus, after penetrating the liquid crystal grating L1, the converged light still is likely to converge as viewed in the second plane, but has been changed from converged light to parallel light as viewed in the first plane. For the same reasons, the liquid crystal grating L2 located in the first plane can diverge the transmitted light in the first plane, but cannot diverge the transmitted light in the second plane. Thus, the liquid crystal granting L2 does not change the parallel propagation of light rays as viewed in the first plane, but has been changed from converged light to parallel light as viewed in a second plane. It can be seen with FIG. 8 that, in cooperation with the arrangement of the electrode layer and the manner of providing electrical signals, the liquid crystal layer 120 can diverge the transmitted light converged toward the light shielding region 13B in the first plane and the second plane, respectively. Furthermore, the electric signals can adjust the divergence amplitude of the liquid crystal layer 120 to the transmitted light by changing the electric field intensity (only the change to parallel propagation is take as an example of a divergent case in FIG. 9 and FIG. 10, whereas the light penetrating the liquid crystal layer 120 as viewed in both the first and second planes may all be diverging light), thereby realizing a liquid crystal display with an adjustable brightness level.

It can be seen that, on basis of the internal structure of the display panel, the light converged by the light extracting element may directly penetrate the liquid crystal layer and reach the light shielding region, thereby achieving the dark display of the sub-pixel region. Moreover, the light converged by the light extracting element may also be diverged by the liquid crystal layer and reach the color filter region surrounded by the light shielding region, thereby achieving the bright display of the sub-pixel region. Based on this, the present disclosure may help to achieve a liquid crystal display device that requires no polarizing plate and may also help reduce the area of the light shielding region (such as black matrices), which thereby realizes a liquid crystal display with higher optical efficiency and better transparency. In addition, based on the first pixel electrode layer and the second pixel electrode layer, and the first stripe electrode and the second stripe electrode that are intersected with each other, the embodiment of the present disclosure may implement adjustment of the brightness level of the sub-pixel region by configuring the light rays to be diverged in two directions, respectively, so that a liquid crystal display having a better performance can be easily achieved by combining with a horizontal electric field modulation technique in the related art.

It should be noted that the way of configuring (shape, size, configuration, position, etc.) the first pixel electrode layer and the first common electrode layer and the way of providing the electrical signals can be achieved by referring to the in-plane switching (IPS) technology or advanced super dimension switch (ADS) in the related art. For example, the plurality of first stripe electrodes in each sub-pixel region are connected as a whole in the arrangement direction, the shape of each first stripe electrode is changed from a straight line to a broken line, and the width of the adjacent first stripe electrodes is designed to be at least one of the aspects described above, which is not limited thereto. For the same reason, the second pixel electrode layer and the second common electrode layer may be correspondingly provided in accordance with the first pixel electrode layer and the first common electrode layer, and can be related to each other in the driving manner to simplify the electrical signal processing process.

In the example shown above, the display panel, in addition to the filter layer, the light extracting layer, and the liquid crystal layer, further includes a first electrode group on a side of the liquid crystal layer close to the filter layer, and a second electrode group on a side of the liquid crystal layer close to the light extracting layer. The first electrode group is configured to form a liquid crystal grating located in the first plane in the liquid crystal layer by an electric field generated by the first electrode group, so that the light rays provided by the light extracting element are diverged in the first plane; and the second electrode group is configured to form a liquid crystal grating located in the second plane in the liquid crystal layer by an electric field generated by the second electrode group, so that the light rays provided by the light extracting element are diverged in the second plane, the first plane and the second plane being intersected with each other. It should be noted that the aforesaid implementation can be regarded as an exemplary implementation of achieving one electrode group with one pixel electrode layer and one common electrode layer. Except the implementation, other electrode groups capable of achieving the aforesaid light divergence effect may also be obtained according to the related art, which is not limited in the present disclosure. For example, the positive liquid crystal material that is vertically oriented in the liquid crystal layer is taken as an example for illustration in the aforesaid description, but for the negative liquid crystal material or other oriented liquid crystal materials, the implementation manner of the electrode group may be correspondingly changed to realize the aforesaid light emitting function. The implementation suitable for designing electrode groups corresponding to different liquid crystal materials is well known to a person skilled in the art, and will not be repeated herein.

It should be further noted that the color filter region in the light transmitting region may be removed in any of the above examples to obtain a display panel capable of black and white display. Of course, the black and white display may also be realized by, for example, changing the filter material in the color filter region to a light transmitting material or a grating, and may not be limited thereto.

It should be further noted that the first planarizing layer 21, the first insulating layer 22, the second insulating layer 23, the second planarizing layer 24, and the base substrate 25 in the display panel are all layer structures that mainly function as support, insulation, planarization, protection, and the like. The related functions can be replaced by other solutions to a possible extent in the related art, and not necessarily set according to the aforesaid layer structure and positional relationship. For example, the base substrate 25 may be located between the second common electrode layer 17 and the second planarizing layer 24, or located on a side of the light extracting layer 11 away from the liquid crystal layer 120, which is not limited thereto.

It should be further noted that the aforesaid solution can be applied to the shape and arrangement of various types of sub-pixel regions, and the pattern of the filter layer and the light extracting element in each sub-pixel region can be set according to requirements.

Figure 11:
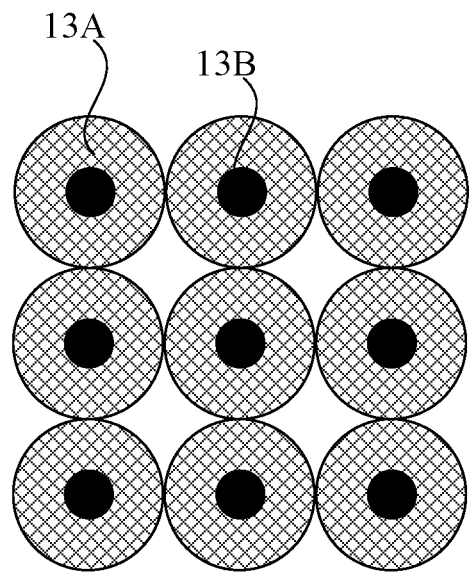
FIG. 11 is a schematic diagram of a planar structure of a filter layer in a display panel according to an embodiment of the present disclosure.

As an example, FIG. 11 is a schematic diagram of a planar structure of a filter layer in a display panel according to an embodiment of the present disclosure. Referring to FIG. 11, the light shielding region 13B in each sub-pixel region may all be circular, and each color filter region 13A may be a circular ring with an inner edge coinciding with the edge of the light shielding region 13B. That is, the color filter region 13A is concentric with the light shielding region 13B, and the color filter regions 13A in two adjacent sub-pixel regions are tangent. In addition, the projection of the light extracting element in each sub-pixel region on the plane where the display panel is located may be a combination of the projection of the light shielding region 13B and the projection of the color filter region 13A (not shown in FIG. 11 due to the shielding) on the plane where the display panel is located. That is, the projection area of the light extracting element 11A on the plane where the display panel is located is equal to the sum of the projection areas of the light shielding region 13B and the color filter region 13A on the plane where the display panel is located. It can be inferred that boundaries between the light extracting elements in adjacent sub-pixel regions are connected to each other.

Figure 12:
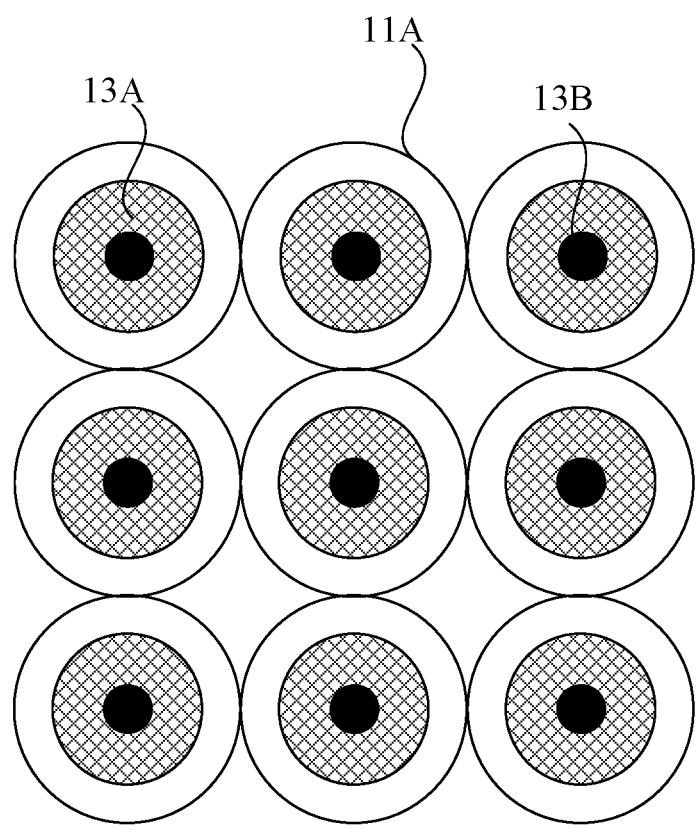
FIG. 12 is a schematic diagram of a planar structure of a filter layer in a display panel according to another embodiment of the present disclosure.

As another example, FIG. 12 is a schematic diagram of a planar structure of a filter layer in a display panel according to another embodiment of the present disclosure; Referring to FIG. 12, the light shielding region 13B in each sub-pixel region may all be circular, and each color filter region 13A may be a circular ring with an inner edge coinciding with the edge of the light shielding region 13B. That is, the color filter region 13A is concentric with the light shielding region 13B. In addition, the projection area of the light extracting element 11A in each sub-pixel region on the plane where the display panel is located is larger than the sum of the projection area of the light shielding region 13B and the projection area of the color filter region 13A on the plane where the display panel is located. Furthermore, boundaries between the light extracting elements 11A in adjacent sub-pixel regions are connected to each other.

In the display panel shown in FIG. 12, the projection area of the light extracting element 11A in each sub-pixel region on the plane where the display panel is located is larger than the sum of the projection area of the light shielding region 13B and the projection area of the color filter region 13A on the plane where the display panel is located, so that gaps may be formed between the color filter regions 13A in adjacent sub-pixel regions, and ambient light may pass through the gaps. Thus, the display panel according to the implementation may be applied to transparent display.

In the aforesaid two examples, the light shielding region 13B and the light extracting element 11A in each sub-pixel region may be designed concentrically.

It should be noted that, compared with the implementation manner in which the light extracting elements in adjacent sub-pixel regions are far away from each other, the manner in which the boundaries between the light extracting elements 11A in adjacent sub-pixel regions are connected to each other is more helpful to compact the arrangement between the sub-pixel regions and thereby achieve a higher PPI (pixels per inch). Compared with that the edges of the light shielding region 13B and the color filter region 13A are both square, a gap for transmitting the ambient light can be left between adjacent color filter regions 13A in the aforesaid setting manner, which is more helpful to improve the overall transparency and the effect of transparent display while achieving the transparent display. Compared with the projection area of the light extracting element which is a equal to the sum of the projection area of the light shielding region 13B and the projection area of the color filter region 13A on the plane where the display panel is located, the projection area of the light extracting element 11A on the plane where the display panel is located, which is greater than the sum of the projection areas of the light shielding region 13B and the color filter region 13A on the plane where the display panel is located, is more helpful to widen the gap between the adjacent color filter regions 13A for transmitting the ambient light, and is also more helpful to improve the overall transparency while achieving the transparent display. Of course, the aforesaid implementation manners are all exemplary, and different implementation manners can be obtained according to different application requirements.

Figure 13:
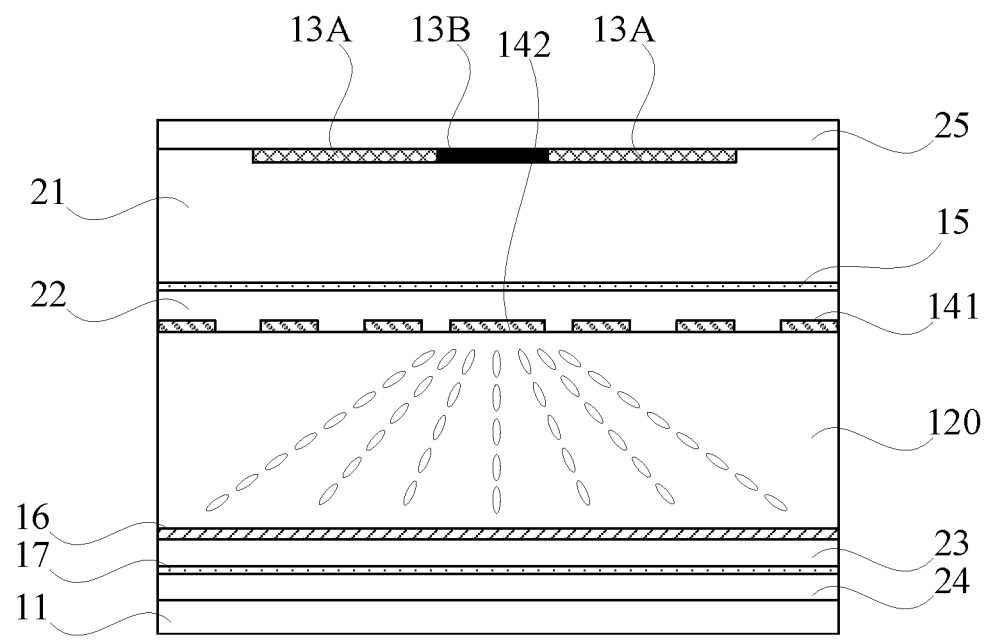
FIG. 13 is a schematic diagram of an internal state of a display panel when a sub-pixel region is at a dark state according to an embodiment of the present disclosure.

FIG. 13 is a schematic diagram of an internal state of a display panel when a sub-pixel region is at a dark state according to an embodiment of the present disclosure. As an example, the following settings can be made based on any of the aforesaid display panel: a block electrode 142 respectively located in each sub-pixel region is provided in the first pixel electrode layer 14; the orthographic projection of the block electrode 142 on the plane where the display panel is located at least partially overlaps with the orthographic projection of the light shielding region 13B of the filter layer on the plane where the display panel is located; furthermore, the display panel further includes a plurality of signal lines (such as, data lines, gate lines, common voltage lines or the like, which are not shown in the drawings), and the first strip electrodes 141 and the block electrode 142 in each sub-pixel region are connected to different signal lines, respectively. In this way, when the sub-pixel region is at the dark state, all the transmitted light converged toward the light shielding region 13B may penetrate the liquid crystal layer 120 along the long axis of the liquid crystal molecules. In an example, the driving method of the display panel further includes: providing a third data voltage to the block electrodes in the sub-pixel regions at the dark state, so that liquid crystal molecules in the liquid crystal layer of the sub-pixel region are deflected toward an orientation in which a long axis is parallel to a propagating direction of light rays provided by the light extracting element. In an example, when the sub-pixel region is at the dark state as shown in FIG. 13, a common voltage is applied to the first strip electrode 141 in the sub-pixel region and also applied to both the second pixel electrode layer 16 and the second common electrode layer 17, and the high forward voltage is applied only to the block electrode 142 (for example, a constant voltage of 5V is taken as an exemplary implementation manner of the third data voltage, and the third data voltage may be adjusted in other implementation manners according to the magnitude of the first and second data voltages), Hence, a cone-shaped electric field is formed between the block electrode 142 and the second pixel electrode layer 16 and the second common electrode layer 17; and the liquid crystal molecules in the liquid crystal layer 120 are deflected along the long axis toward the block electrode 142 to form an arrangement state of liquid crystal molecules as shown in FIG. 13. In this way, the light rays converged toward the light shielding region 13B as shown in FIG. 3 may be propagated in a direction closer to the long axis of the liquid crystal molecules, so that the difference in the refractive indexes due to the difference in the propagating directions of the light rays may be relatively reduced, and the light rays refracted in the liquid crystal layer and thereby penetrating the filter layer from the outside of the light shielding region 13B is reduced, thereby helping to stabilize the brightness level of the sub-pixel region at the dark state and also helping to improve the display contrast. In addition, the light shielding region may be reduced, and the aperture opening ratio of the display panel may be improved. Of course, the position, shape, area, and voltage of the block electrode may be accurately designed according to the light path of the dark state display to achieve a better effect. It should be noted that the so-called block refers to a shape having the same or approximately equal length and width, and may be, for example, rectangular, square, circular, oval, or the like.

Figure 14:
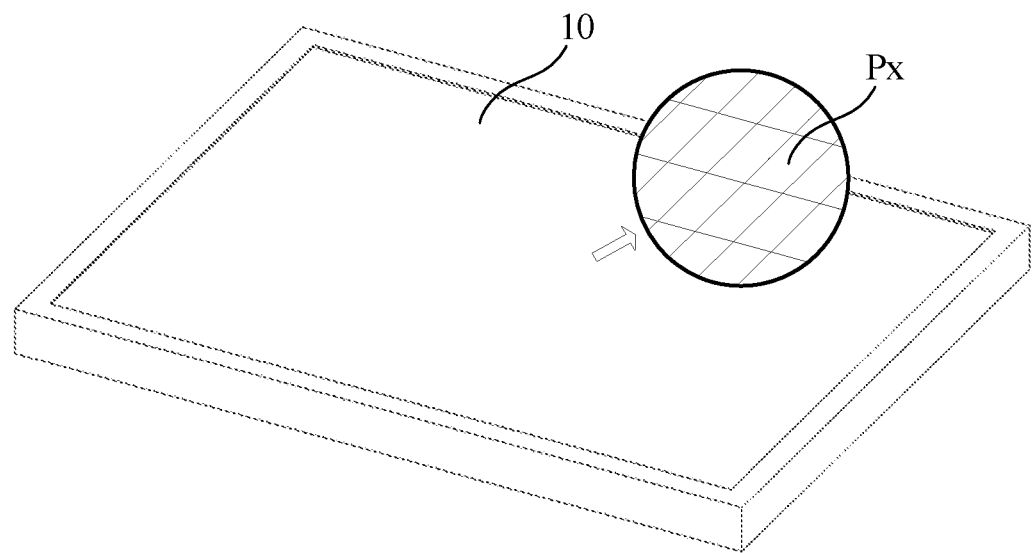
FIG. 14 is a schematic diagram of a structure of a display device according to an embodiment of the present disclosure.

Based on the same disclosed concept, the embodiment of the present disclosure provides a display device, and the display device includes any one of the display panels described above. The display device provided by the embodiment of the present disclosure may be any product or component having a display function, such as a mobile phone, a tablet computer, a TV set, a display, a notebook computer, a digital photo frame, a navigator etc. As an example, FIG. 14 is a schematic diagram of a structure of a display device according to an embodiment of the present disclosure. The display device includes any one of the display panels described above, and the display region of the display panel 10 includes sub-pixel regions Px arranged in rows and columns. In each sub-pixel region Px, the display panel, based on its structure, may help to achieve a liquid crystal display device that requires no polarizing plate and also help to reduce the area of the light shielding region (such as black matrices), which thereby realizes a liquid crystal display with higher optical efficiency and better transparency.

Figure 15:
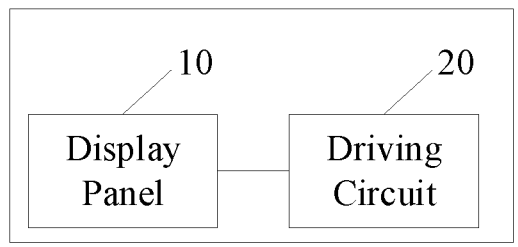
FIG. 15 is a block diagram of a structure of a display device according to an embodiment of the present disclosure.

FIG. 15 is a block diagram of a structure of a display device according to an embodiment of the present disclosure. Referring to FIG. 15, the display device further includes a driving circuit 20 that is configured to implement the aforesaid driving method.

The technical elements in different aspects as illustrated in the examples above may be combined with each other to a possible extent. Furthermore, the aforesaid description is merely the embodiment of the present disclosure and is not intended to limit the present disclosure. Any modification, equivalent replacement, improvement, etc. made according to the spirit and principle of the present disclosure shall be regarded as within the protection scope of claims of the present disclosure.

What is claimed is:
1. A display panel, comprising:
   a filter layer, comprising a light shielding region and a light transmitting region in each of sub-pixel regions, the light transmitting region surrounding the light shielding region in each of the sub-pixel regions;

a light extracting layer, comprising a light extracting element in each of the sub-pixel regions; the light extracting element being configured to provide light rays propagating toward a light shielding region of a sub-pixel region where the light extracting element is; and a light transmitting layer between the filter layer and the light extracting layer, and configured to provide sub-pixel regions at a bright state with gratings distributed in a first plane and a second plane so that the light rays provided by the light extracting element are diverged in the first plane and the second plane, and provide sub-pixel regions at a dark state with liquid crystal molecules whose long axis orientations are close to propagating directions of light rays provided by light extracting elements in the sub-pixel regions at the dark state; wherein the first plane and the second plane are intersected with each other and perpendicular to a light emitting surface of the display panel.

2. The display panel according to claim 1, wherein the light transmitting layer comprises:

a liquid crystal layer, and a first electrode group and a second electrode group on two sides of the liquid crystal layer, respectively; wherein the first electrode group is on a side of the liquid crystal layer close to the filter layer; and the second electrode group is on a side of the liquid crystal layer close to the light extracting layer;

the first electrode group is configured to form a liquid crystal grating in the first plane in the liquid crystal layer by an electric field generated by the first electrode group, so that the light rays provided by the light extracting element are diverged in the first plane; and the second electrode group is configured to form a liquid crystal grating in the second plane in the liquid crystal layer by an electric field generated by the second electrode croup, so that the light rays provided by the light extracting element are diverged in the second plane.

3. The display panel according to claim 2, wherein the first electrode group comprises a first pixel electrode layer and a first common electrode layer, and the second electrode group comprises a second pixel electrode layer and a second common electrode layer; wherein the first common electrode layer is between the filter layer and the first pixel electrode layer;

the second common electrode layer is between the second pixel electrode layer and the light extracting layer; and the first pixel electrode layer comprises a plurality of first strip electrodes arranged along a first direction; the second pixel electrode layer comprises a plurality of second strip electrodes arranged along a second direction; and each of the sub-pixel regions is provided with at least two of the first strip electrodes and at least two of the second strip electrodes, the first direction being parallel to the first plane, and the second direction being parallel to the second plane.

4. The display panel according to claim 3, wherein the first pixel electrode layer further comprises a block electrode in each of the sub-pixel regions, respectively;

an orthographic projection of the block electrode on a plane where the display panel is at least partially overlaps with an orthographic projection of the light shielding region of the filter layer on the plane where the display panel is located; and the display panel further comprises a plurality of signal lines, any one of the at least two of the first strip electrodes and the block electrode being respectively connected to different signal lines in each of the sub-pixel regions.

5. The display panel according to claim 4, wherein the block electrode is configured to deflect, in sub-pixel regions at the dark state, a long axis of a liquid crystal in the liquid crystal layer toward the light shielding region by an electric field generated by the block electrode.

6. The display panel according to claim 3, wherein the first direction and the second direction are perpendicular to each other.

7. The display panel according to claim 1, wherein the light transmitting region in each of the sub-pixel regions comprises a color filter region, and the color filter region surrounds the light shielding region in each of the sub-pixel regions; and a projection area of the light extracting element is not less than a sum of a projection area of the light shielding region and a projection area of the color filter region on a plane where the display panel is located.

8. The display panel according to claim 7, wherein the light shielding region is circular, and the color filter region is annular and concentric with the light shielding region.

9. The display panel according to claim 1, wherein the light extracting element comprises a concentric annular grating on a light emitting surface of a light guiding plate.

10. A display device, comprising a display panel which comprises:

a filter layer, comprising a light shielding region and a light transmitting region in each of sub-pixel regions, the light transmitting region surrounding the light shielding region in each of the sub-pixel regions;

a light extracting layer, comprising a light extracting element in each of the sub-pixel regions, the light extracting element being configured to provide light rays propagating toward a light shielding region of a sub-pixel region where the light extracting element is; and a light transmitting layer between the filter layer and the light extracting layer, and configured to provide sub-pixel regions at a bright state with gratings distributed in a first plane and a second plane so that the light rays provided by the light extracting element are diverged in the first plane and the second plane, and provide sub-pixel regions at a dark state with liquid crystal molecules whose long axis orientations are close to propagating directions of light rays provided by light extracting elements in the sub-pixel regions at the dark state; wherein the first plane and the second plane are intersected with each other and perpendicular to a light emitting surface of the display panel.

11. The display device according to claim 10, wherein the light transmitting layer comprises:

a liquid crystal layer, and a first electrode group and a second electrode group on two sides of the liquid crystal layer, respectively;

the first electrode group is on a side of the liquid crystal layer close to the filter layer; and the second electrode group is on a side of the liquid crystal layer close to the light extracting layer;

wherein the first electrode group is configured to form a liquid crystal grating in the first plane in the liquid crystal layer by an electric field generated by the first electrode group, so that the light rays provided by the light extracting element are diverged in the first plane;

and the second electrode group is configured to form a liquid crystal grating in the second plane in the liquid crystal layer by an electric field generated by the second electrode group, so that the light rays provided by the light extracting element are diverged in the second plane.

12. The display device according to claim 11, wherein the first electrode group comprises a first pixel electrode layer and a first common electrode layer, and the second electrode group comprises a second pixel electrode layer and a second common electrode layer; wherein
the first common electrode layer is between the filter layer and the first pixel electrode layer;
the second common electrode layer is between the second pixel electrode layer and the light extracting layer; and
the first pixel electrode layer comprises a plurality of first strip electrodes arranged along a first direction; the second pixel electrode layer comprises a plurality of second strip electrodes arranged along a second direction; and each of the sub-pixel regions is provided with at least two of the first strip electrodes and at least two of the second strip electrodes, the first direction being parallel to the first plane, and the second direction being parallel to the second plane.

13. The display device according to claim 12, further comprising:
a driving circuit, configured to: provide a first data voltage to each of first strip electrodes in sub-pixel regions at the bright state to form a liquid crystal grating in the first plane in the liquid crystal layer, so that the light rays provided by the light extracting elements are diverged in the first plane, and
provide a second data voltage to each of second strip electrodes in sub-pixel regions at the bright state to form a liquid crystal grating in the second plane in the liquid crystal layer, so that the light rays provided by the light extracting elements are diverged in the second plane.

14. The display device according to claim 13, wherein the driving circuit is further configured to provide a common voltage to each of first strip electrodes and second strip electrodes in sub-pixel regions at the dark state, so that the light rays provided by the light extracting element penetrate the liquid crystal layer and reach the light shielding regions.

15. The display panel according to claim 13, wherein the first pixel electrode layer further comprises a block electrode in each of the sub-pixel regions, respectively, and an orthographic projection of the block electrode on a plane where the display panel is at least partially overlaps with an orthographic projection of the light shielding region of the filter layer on the plane where the display panel is located; and
the driving circuit is further configured to provide a third data voltage to block electrodes in sub-pixel regions at the dark state, so that liquid crystal molecules in the liquid crystal layer are deflected toward an orientation in which a long axis is parallel to a propagating direction of light rays provided by the light extracting element in the sub-pixel regions at the dark state.

16. The display device according to claim 10, wherein the light extracting element comprises a concentric annular grating on a light emitting surface of a light guiding plate.

17. A driving method of a display panel, wherein the display panel comprises: a filter layer, comprising a light shielding region and a light transmitting region in each of sub-pixel regions, the light transmitting region surrounding the light shielding region in each of the sub-pixel regions; a light extracting layer, comprising a light extracting element in each of the sub-pixel regions, the light extracting element being configured to provide light rays propagating toward a light shielding region of a sub-pixel region where the light extracting element is; and a light transmitting layer between the filter layer and the light extracting layer, and configured to provide sub-pixel regions at a bright state with gratings distributed in a first plane and a second plane so that the light rays provided by the light extracting element are diverged in the first plane and the second plane, and provide sub-pixel regions at a dark state with liquid crystal molecules whose long axis orientations are close to propagating directions of light rays provided by light extracting elements in the sub-pixel regions at the dark state; wherein the first plane and the second plane are intersected with each other and perpendicular to a light emitting surface of the display panel; wherein
the light transmitting layer comprises: a liquid crystal layer, and a first electrode group and a second electrode group on two sides of the liquid crystal layer, respectively; wherein the first electrode group is on a side of the liquid crystal layer close to the filter layer; and the second electrode group is on a side of the liquid crystal layer close to the light extracting layer; the first electrode group is configured to form a liquid crystal grating in the first plane in the liquid crystal layer by an electric field generated by the first electrode group, so that the light rays provided by the light extracting element are diverged in the first plane; and the second electrode group is configured to form a liquid crystal grating in the second plane in the liquid crystal layer by an electric field generated by the second electrode group, so that the light rays provided by the light extracting element are diverged in the second plane; and
the first electrode group comprises a first pixel electrode layer and a first common electrode layer, and the second electrode group comprises a second pixel electrode layer and a second common electrode layer; wherein the first common electrode layer is between the filter layer and the first pixel electrode layer; the second common electrode layer is between the second pixel electrode layer and the light extracting layer; and the first pixel electrode layer comprises a plurality of first strip electrodes arranged along a first direction; the second pixel electrode layer comprises a plurality of second strip electrodes arranged along a second direction; and each of the sub-pixel regions is provided with at least two of the first strip electrodes and at least two of the second strip electrodes, the first direction being parallel to the first plane, and the second direction being parallel to the second plane;
and the method comprises:
providing a first data voltage to each of first strip electrodes in sub-pixel regions at the bright state to form a liquid crystal grating in a first plane in the liquid crystal layer, so that the light rays provided by the light extracting elements are diverged in the first plane; and
providing a second data voltage to each of second strip electrodes in the sub-pixel regions at the bright state to form a liquid crystal grating in a second plane in the liquid crystal layer, so that the light rays provided by the light extracting elements are diverged in the second plane.

18. The method according to claim 17, further comprising:

providing a common voltage to each of first strip electrodes and second strip electrodes in sub-pixel regions at the dark state, so that the light rays provided by the light extracting element penetrate the liquid crystal layer and reach the light shielding regions in the sub-pixel regions at the dark state.

19. The method according to claim 17, wherein the first pixel electrode layer further comprises a block electrode in each of the sub-pixel regions, respectively, and an orthographic projection of the block electrode on a plane where the display panel is at least partially overlaps with an orthographic projection of the light shielding region of the filter layer on the plane where the display panel is located; and the method further comprises:

providing a third data voltage to each of block electrodes in sub-pixel regions at the dark state, so that liquid crystal molecules in the liquid crystal layer are deflected toward an orientation in which a long axis is parallel to a propagating direction of the light rays provided by the light extracting element in the sub-pixel regions at the dark state.

20. The method according to claim 17, wherein the light extracting element comprises a concentric annular grating on a light emitting surface of a light guiding plate.

* * * * *